JOHN CHARLES BARKER, OF LEEDS, ENGLAND.

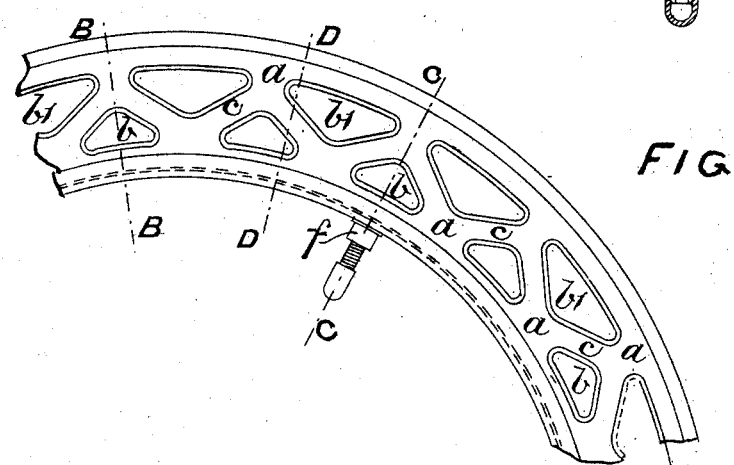

TIRE.

No. 927,477.     Specification of Letters Patent.     Patented July 13, 1909.

Application filed January 27, 1909. Serial No. 474,606.

*To all whom it may concern:*

Be it known that I, JOHN CHARLES BARKER, a subject of the King of Great Britain and Ireland, residing at Leeds, in the county of York, England, have invented a certain new and useful Improvement in Tires, for which I have obtained Letters Patent in Great Britain and Ireland, No. 2,736, bearing date the 7th of February, 1908, and of which the following is a specification.

This invention relates to improvements in tires for road vehicles, motor cars and the like which are formed or provided with inflatable recesses; the object of my improvement being to combine as much as possible the advantages of both solid and pneumatic tires without, or with as few as possible, of the defects of both. I obtain these objects by the construction illustrated by, and hereunder described with reference to, the accompanying drawings, in which:—

Figure 1 is a side elevation of a portion of a tire, constructed according to this invention. Fig. 2 is a mid section of a part of the tire on line A A of Fig. 3. Fig. 3 is a cross-section on the line B B of Fig. 1 and Fig. 4 is a cross-section on the line C C of Fig. 1. Fig. 5, is a cross section of a slight modification hereinafter referred to.

The same reference letter is used for the same or corresponding parts in all the views.

$a$ indicates the rubber or other material forming the body of the tire. According to this invention, the tire, which is rectangular or roughly rectangular in transverse or cross section, has a number of holes or openings $b$, $b^1$, through it from side to side, leaving relatively stout barriers $c$ of rubber or other material between adjoining openings. These barriers are pierced with slits or small holes $d$, so that there is connection or passage for the compressed air completely around the tire, each and all of the openings being in connection or communication with the two next adjoining openings.

$e$ are end closing plug pieces, which are formed to fit and are hermetically sealed or cemented in the ends of the openings $b$, $b^1$, so as to form hollow chambers, which are filled with compressed air through a non-return valve, $f$, fitted on the inner side of the tire and discharging into one of the chambers. The plug pieces $e$ are fixed in position by rubber solution or other suitable cementing material, and are preferably made hollow or recessed at the outer side.

It will be evident, that this construction insures uniformity of pressure in the openings or chambers, and a uniform resiliency all around the tire. Should a puncture take place, the escape of the compressed air is not so rapid, and the puncture is not liable to be enlarged by the escaping air, as the pressure is reduced owing to the air having to pass alternately through the narrow slits $d$ and the relatively large openings or chambers $b$ $b^1$. As the slits $d$ at the moment they are next the ground, are more or less closed by the weight on this part of the tire, the air contained in any chamber is more or less confined in such chamber at the moment it comes next the ground, so that notwithstanding that a puncture may have taken place, the tire retains more or less of its pneumatic resiliency.

The transverse openings $b$, $b^1$, are preferably made triangular or roughly triangular in section, and arranged in two circular rows, lettered respectively $b$, $b^1$; those $b$ of the inner row being arranged with apexes of their cross sections directed outward, while the openings $b^1$ of the outer row, which alternate with those of the inner row, have the apexes of their cross sections directed inward. With this shape and arrangement of the openings or chambers, any radial thrust on the tire passes across the wider part of one chamber, (see lines B B and C C, or through the narrower parts of two chambers, see line D D Fig. 1; thereby securing uniformity in the compression all around the tire. No radial line passes entirely through rubber.

It will be evident that as shown in Fig. 5, the openings $b$, $b^1$, may be made only partly through the tire, leaving only one end of the opening to be closed by a closing plug piece $e$.

I wish it to be understood, that tires with inflatable recesses are not new, and I do not therefore claim such broadly.

What I do claim and desire to secure by Letters Patent is:—

1. In wheels for motor cars and other road vehicles, the combination of a tire having transverse openings through it from side to side, air passages connecting adjoining transverse openings and end closing plug pieces, substantially as set forth.

2. In wheels for motor cars and other road vehicles, the combination of a tire having an inner row of transverse openings through it from side to side, said openings being triangular or approximately triangular in section and with the apexes directed outward, and an outer row of similar transverse openings but with the apexes directed inward, end closing plug pieces of corresponding section, and barriers between adjoining transverse openings having air passages through them connecting such openings or chambers, all substantially as set forth.

3. In wheels for motor cars and other road vehicles, the combination of a tire having an inner row of transverse openings, triangular or approximately triangular in cross section, and an outer row of similar openings alternating with and partly overlapping the adjacent openings of the inner row, barriers between adjacent openings pierced with connecting air passages, and end closing plug pieces, all substantially as set forth.

4. In wheels for motor cars and other road vehicles, the combination of a tire having transverse openings, recessed end closing plug pieces, and barriers between adjacent openings pierced with connecting air passages, all substantially as set forth.

In testimony whereof I have signed my name to this specification in the presence of two subscribing witnesses.

JOHN CHARLES BARKER.

Witnesses:
J. CLARK JEFFERSON,
WM. T. EDMONDSON.